(12) United States Patent
Shirai

(10) Patent No.: US 6,350,975 B1
(45) Date of Patent: *Feb. 26, 2002

(54) BEAM SPLITTER FOR AUTOMATIC FOCUSING DEVICE

(75) Inventor: Masami Shirai, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/305,750

(22) Filed: May 6, 1999

(30) Foreign Application Priority Data

May 8, 1998 (JP) ............................ 10-126233

(51) Int. Cl.[7] .............................................. G02B 27/40
(52) U.S. Cl. ..................... 250/201.3; 359/383
(58) Field of Search ........................ 250/201.3, 201.2, 250/204, 205, 216, 201.5; 359/383, 583, 636, 629, 249, 250, 251, 639, 620–625; 369/44, 14

(56) References Cited

U.S. PATENT DOCUMENTS

| 4,650,335 A | | 3/1987 | Ito et al. ...................... 356/398 |
| 4,670,645 A | * | 6/1987 | Ohtaka et al. ............. 250/208.1 |
| 4,862,442 A | * | 8/1989 | Tadokoro et al. ........ 369/44.14 |
| 5,400,179 A | | 3/1995 | Ito ................................ 359/588 |
| 5,424,876 A | | 6/1995 | Fujii ............................ 359/884 |
| 5,715,101 A | | 2/1998 | Nakamura et al. .......... 359/823 |
| 5,796,517 A | | 8/1998 | Sensui et al. ................ 359/426 |
| 5,844,231 A | | 12/1998 | Suzuki et al. ............ 250/201.2 |
| 5,856,663 A | | 1/1999 | Suzuki et al. ............ 250/201.2 |
| 5,856,664 A | | 1/1999 | Suzuki et al. ............ 250/201.2 |
| 5,872,661 A | | 2/1999 | Suzuki et al. ............... 359/698 |
| 5,886,340 A | | 3/1999 | Suzuki et al. ............ 250/201.7 |

FOREIGN PATENT DOCUMENTS

JP  10-73772  3/1998

* cited by examiner

Primary Examiner—Que T. Le
Assistant Examiner—Thanh X. Luu
(74) Attorney, Agent, or Firm—Greenblum & Bernstein, P.L.C.

(57) ABSTRACT

A beam splitting optical system for an automatic focusing apparatus includes a telescopic system having an objective optical system and a viewing optical system, a beam splitter which splits object-carrying light transmitted through the objective optical system from the telescopic optical system by a splitter surface, and a focus detection optical system having a pair of light receivers which receive beams of the object-carrying light split by the splitter surface. The focus detection optical system is arranged so that beams of the object-carrying light to be respectively received by the light receiver are incident upon the splitter surface of the beam splitter at different incident angles. The transmittance and reflectance of the splitter surface of the beam splitter is not uniform in distribution and changes depending on the incident angle of the object-carrying light incident thereupon.

8 Claims, 8 Drawing Sheets

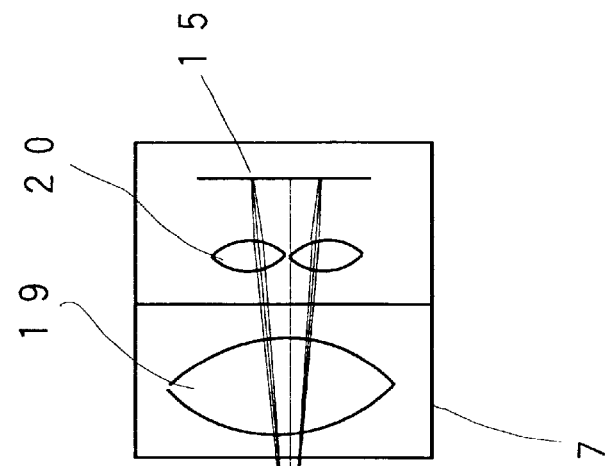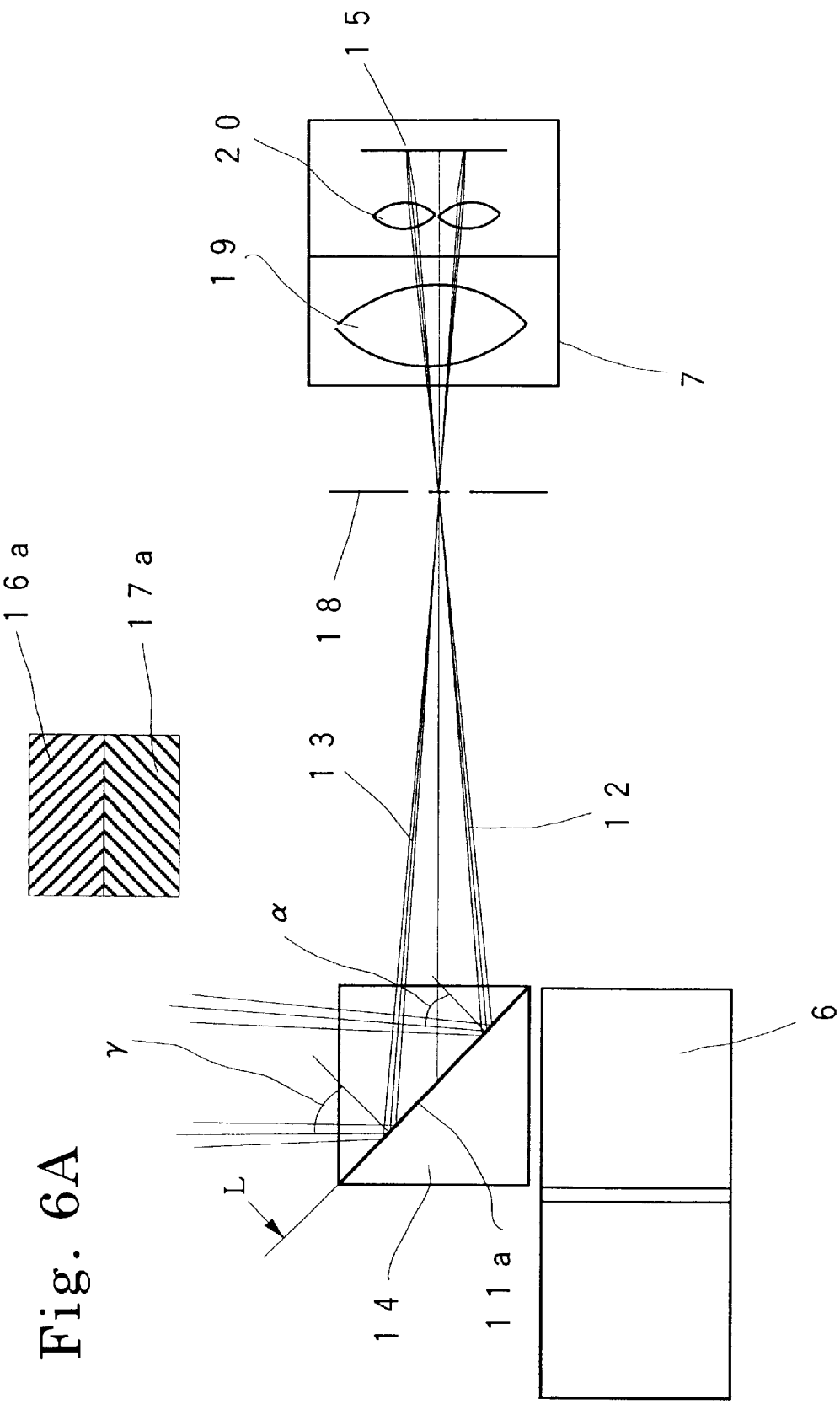

BEAM SPLITTER FOR AUTOMATIC FOCUSING DEVICE

BACKGROUND OF THE INVENTION

1. Field of the Invention

The present invention relates to a beam splitting optical system for an auto-focus sensor, which can be utilized in an optical instrument, and in particular with a surveying instrument.

2. Description of the Related Art

In a conventional automatic focusing device for a surveying instrument having a collimator telescope (such as a total station), a light path of a focus detection optical system is split from a light path of a collimating optical system by a beam splitting optical system to detect the focus state on a surface (referred to as a reference focusing surface) which is optically equivalent to the focusing surface of the collimating optical system by means of a phase difference detection type auto-focus sensor module having a pair of CCD sensors, in order to calculate the amount of defocus of a focusing lens. Consequently, the focusing lens is moved to an in-focus position in accordance with the defocus amount to complete an automatic focusing (AF) operation. The principle of the AF function in which the phase difference is detected is known in the art, and is used in an AF single lens reflex camera.

In a conventional beam splitter system for an auto-focus sensor, the beam splitter and the auto-focus sensor are arranged so that the beams of light received by the pair of CCD sensors are made incident upon a coated splitter surface of the beam splitting optical system at different incident angles. In this arrangement, since the transmittance of the splitter surface which is made of a multi-layered dielectric film varies depending on the incident angle, there is a difference in the level between the quantities of light received by the pair of CCD sensors. To prevent a level difference occurring, it is necessary to arrange the optical elements so that the incident angles of the beams incident upon the split surface are identical. This reduces the freedom of design of the layout of the optical elements, hindering any possible enhancement in operational efficiency, hindering miniaturization and reduces the weight of the optical system.

The difference in the quantity of light caused due to the above-mentioned arrangement is usually corrected using a correction coefficient in the determination of the focus during the automatic focusing operation. However, if the difference is large or if electric noise is produced in the auto-focus sensor itself, the noise is increased according to the correction coefficient, thus resulting in a failure to perform a precise auto-focusing operation. This tends to occur when the quantity of light is small, for example, at dusk.

SUMMARY OF THE INVENTION

It is an object of the present invention to eliminate the above-mentioned drawbacks of the prior art, by reducing the difference in the quantity of light received by a pair of CCD sensors within the auto-focus sensor to thereby reduce the restriction of the arrangement of the components in the beam splitting optical system.

In order to achieve the above-mentioned aim, there is provided a beam splitting optical system for an automatic focusing apparatus including: a telescopic system having an objective optical system and a viewing optical system; a beam splitter provided between the objective optical system and the viewing optical system, the beam splitter being provided with a splitter surface to split object-carrying light transmitted through the objective optical system; a focus detection optical system having a pair of light receiving elements which respectively receive an object-carrying light beam split by and transmitted through the splitter surface of the beam splitter, the focus detection optical system being arranged so that the object-carrying light beam to be respectively received by the respective light receiving elements is incident upon the splitter surface at different incident angles; and wherein the transmittance and reflectance of the splitter surface of the beam splitter is set so that the transmittance and reflectance changes depending on the incident angle of the object-carrying light incident thereupon to compensate the difference of distribution quantity of the object-carrying light beam that is passed through the splitter surface, said difference being caused due to the difference of the incident angle of the object-carrying light beam incident upon the splitter surface.

According to another aspect of the present invention, there is provided a beam splitting optical system for an automatic focusing apparatus including: a telescopic system having an objective optical system and a viewing optical system through which an object image formed on a predetermined focusing surface by the objective optical system can be viewed; a beam splitter provided between the objective optical system and the viewing optical system, the beam splitter being provided with a splitter surface to split object-carrying light transmitted through the objective optical system; and an auto-focus sensor module which detects a focus state on a reference focusing surface which is optically equivalent to the predetermined focusing surface, on the light path of the object-carrying light split by the beam splitter, the auto-focus sensor module being provided with a pair of optical sensors, the auto-focus sensor module and the beam splitter being arranged so that an object-carrying light beam to be respectively received by the pair of optical sensors is incident upon the splitter surface of the beam splitter at different incident angles; wherein the transmittance and reflectance of the splitter surface of the beam splitter is set so that the transmittance and reflectance changes depending on the incident angle of the object-carrying light incident thereupon to compensate the difference of distribution quantity of the object-carrying light beam that is passed through the splitter surface, said difference being caused due to the difference of the incident angle of the object-carrying light beam incident upon the splitter surface.

Preferably, the transmittance and reflectance of the splitter surface is determined so that the quantities of the object-carrying light beams transmitted therethrough or reflected thereby are substantially identical.

According to the above mentioned structures, since the difference of the distribution quantity of the object-carrying light beam that is passed through the splitter surface is compensated, a precise focusing operation can be carried out.

Preferably, the splitter surface includes a multi-layered dielectric film.

Preferably, the splitter surface is divided into at least two areas which have different transmittance and reflectance. Preferably these two areas are multi-layered dielectric films that have different film structures depending on the transmittance and reflectance thereof.

Preferably, the splitter surface includes a reflection surface of an optical element which constitutes an image erecting optical system provided in the telescopic optical system. Preferably, the optical element is a Porro prism.

The present disclosure relates to subject matter contained in Japanese Patent Application No. 10-126233 (filed on May 8, 1998) which is expressly incorporated herein by reference in its entirety.

BRIEF DESCRIPTION OF THE DRAWINGS

The invention will be described below in detail with reference to the accompanying drawings in which:

FIG. 6A is a top view of a main portion of a second embodiment of the present invention; and FIG. 6B is an end view of a coated splitter surface, viewed from an arrow L in FIG. 6A;

DESCRIPTION OF THE PREFERRED EMBODIMENT

Embodiments of the present invention will be discussed below.

Figure 1:
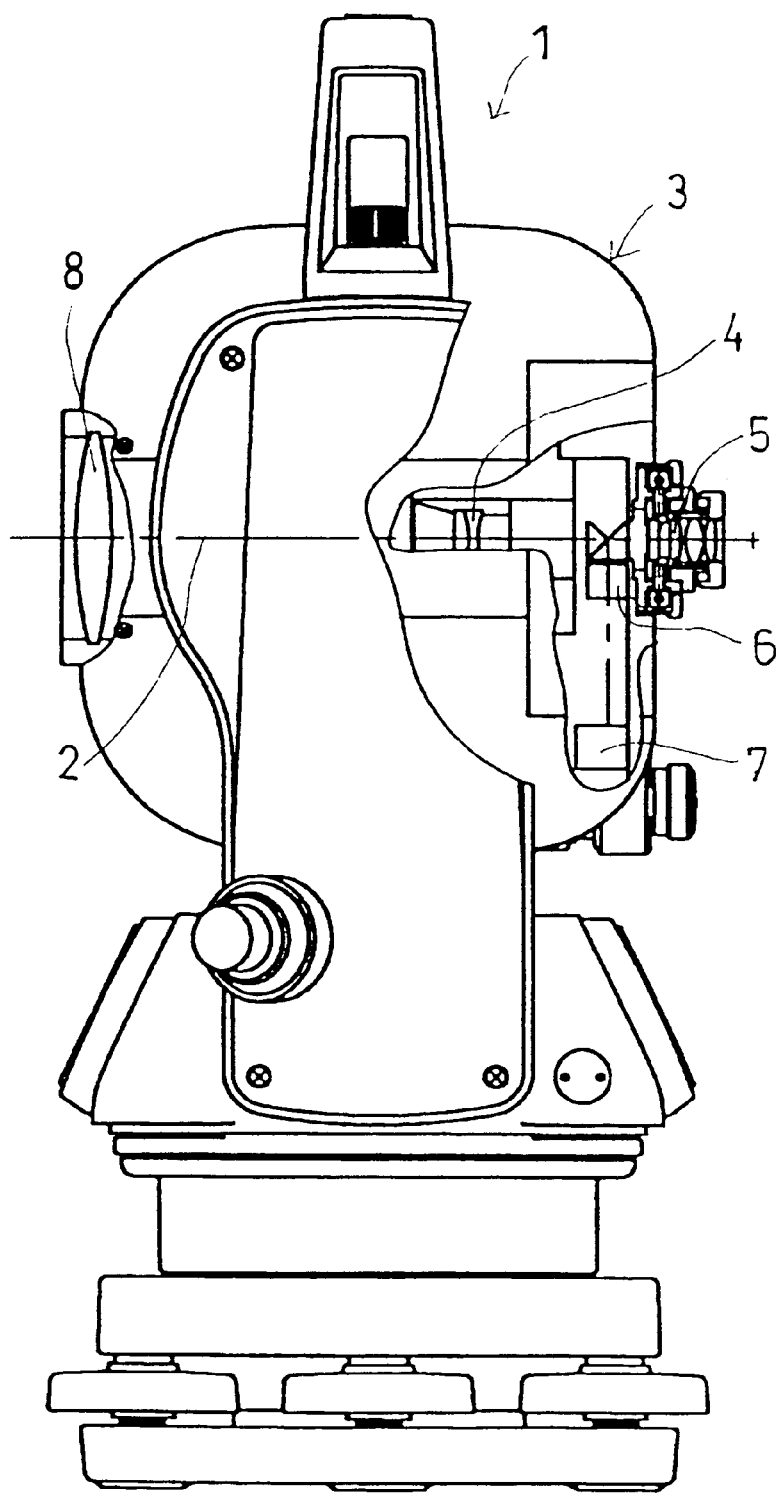
FIG. 1 is a partially sectioned side view of a surveying instrument total station according to an embodiment of the present invention.
Figure 2:
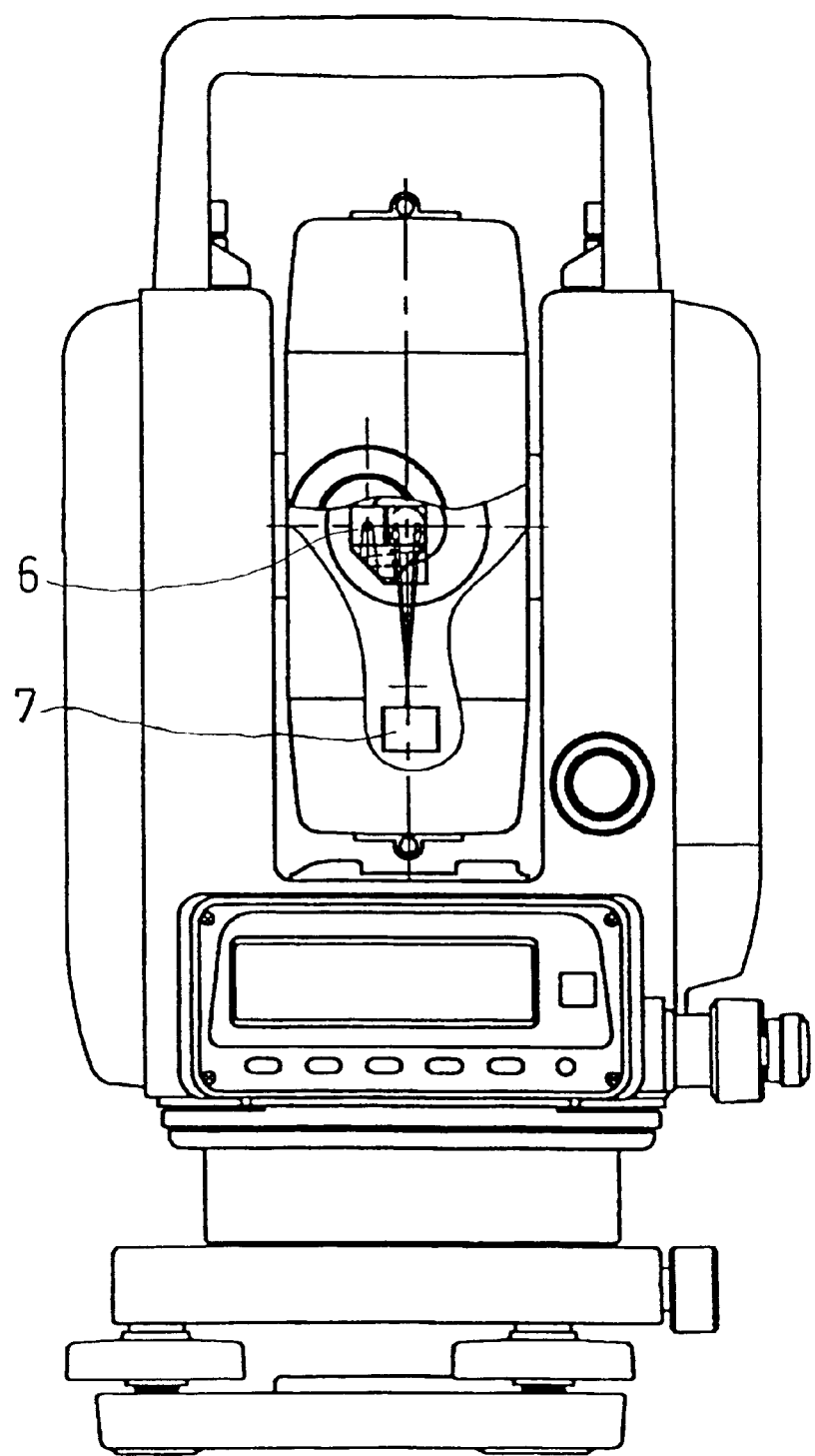
FIG. 2 is a front elevational view of a total station shown in FIG. 1.

FIGS. 1 and 2 are side and front views of a surveying instrument total station, respectively. An image of an object placed within the collimation field of a telescope 3 of the total station 1 is formed as an erect image on a focusing plate 5 on a predetermined focusing surface by an objective lens 8 which constitutes an objective optical system, a focusing lens 4, and a Porro prism 6. An operator can view the object image formed on the focusing plate through an eyepiece (ocular lens) which constitutes a viewing optical system.

FIGS. 4A and 4B show the positional relationship between the Porro prism 6 and an auto-focus sensor module 7. The auto-focus sensor module 7 is provided on the light path of the focus detection optical system which is split from the light path of the objective optical system by a coated splitter surface 11 of the Porro prism 6 to detect the focus state (amount of defocus) on a reference focusing surface 18 18 which is optically equivalent to the focusing plate 5. Namely, object-carrying light transmitted through the objective lens 8 is split into light which is made incident upon the focusing plate 5 and focus detection light which is made incident upon the auto-focus sensor module 7. The auto-focus sensor module 7 receives the object-carrying light via a pair of CCD sensors and sends electric signals to a focus state calculation (defocus calculation) portion (not shown). The auto-focus sensor module 7 is well known in the art.

Figure 3:
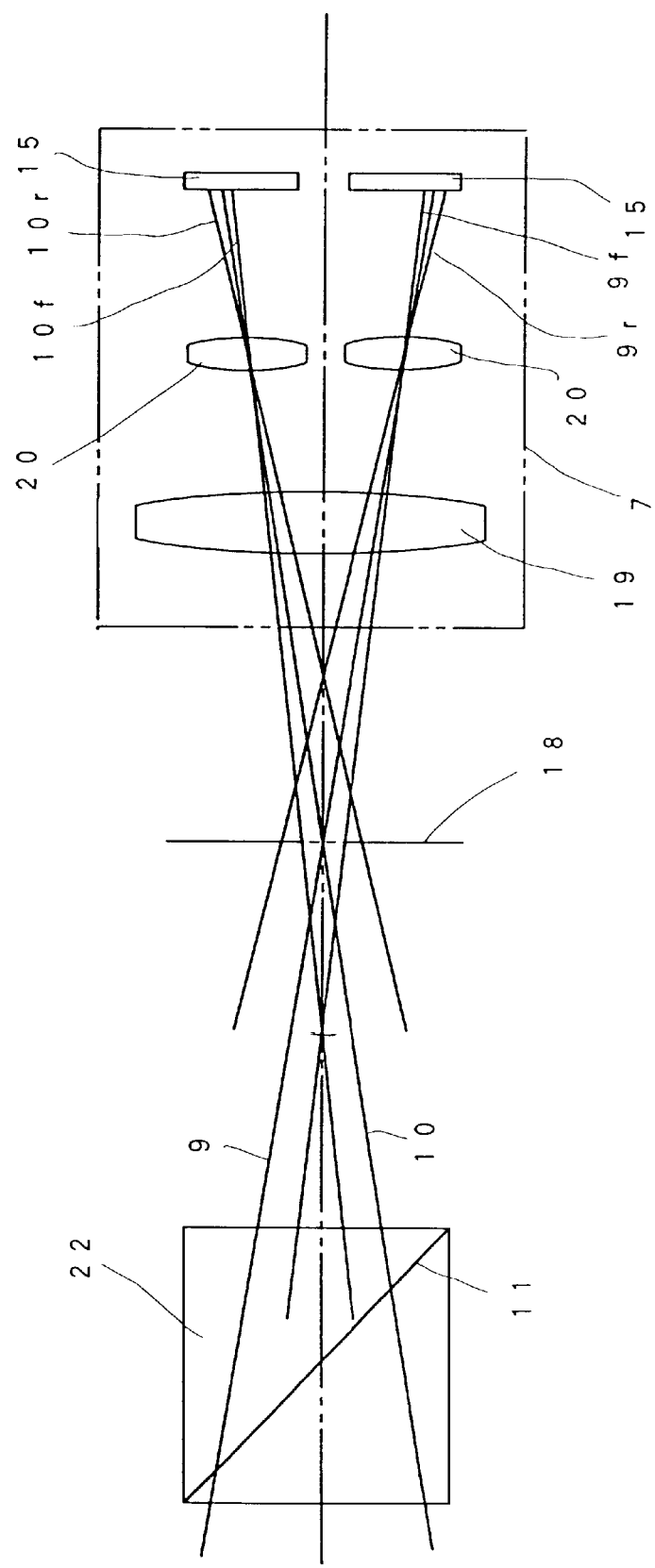
FIG. 3 is a conceptual view of the principle of an auto-focus system.

FIG. 3 shows the main concept of the focus detection of the auto-focus sensor module 7 by way of example. In FIG. 3, a condenser lens 19 and a pair of separator lenses are provided behind the reference focusing surface 18. A pair of CCD sensors 15 are provided behind the corresponding separator lenses 20. The light transmitted through the condenser lens 19 is split by the separator lenses and the split beams are received by the respective CCD sensors 15 to form object images. Principal rays of the beams which form the object images on the sensors are indicated by the numerals 9 and 10.

The image formation position of the CCD sensors 15 at which the object images are formed varies depending on the position of the image on the reference focusing surface 18, i.e., when the image of a target is formed correctly on the reference focusing surface 18 represented by the principal rays 9 and 10; when the image is formed in front of the reference focusing plane 19 represented by the rays 9f and 10f (front focus); or when the image is formed behind the reference focusing surface 18 represented by the rays 9r and 10r (rear focus), as shown in FIG. 3. The deviation from the focus position is detected based on the distance between the object images formed on the CCD sensors 15. The focus state calculation portion to which the output of the CCD sensors 15 are input, amplifies the output by a preamplifier (not shown) and performs the calculation by a calculation circuit (not shown) to detect an "in-focus", "out-of-focus", "front focus" or "rear focus". Consequently, the amount of defocus on the reference focusing surface 18 and the displacement of the focusing lens 4 necessary to move the same to the focal position are determined.

Figure 4:
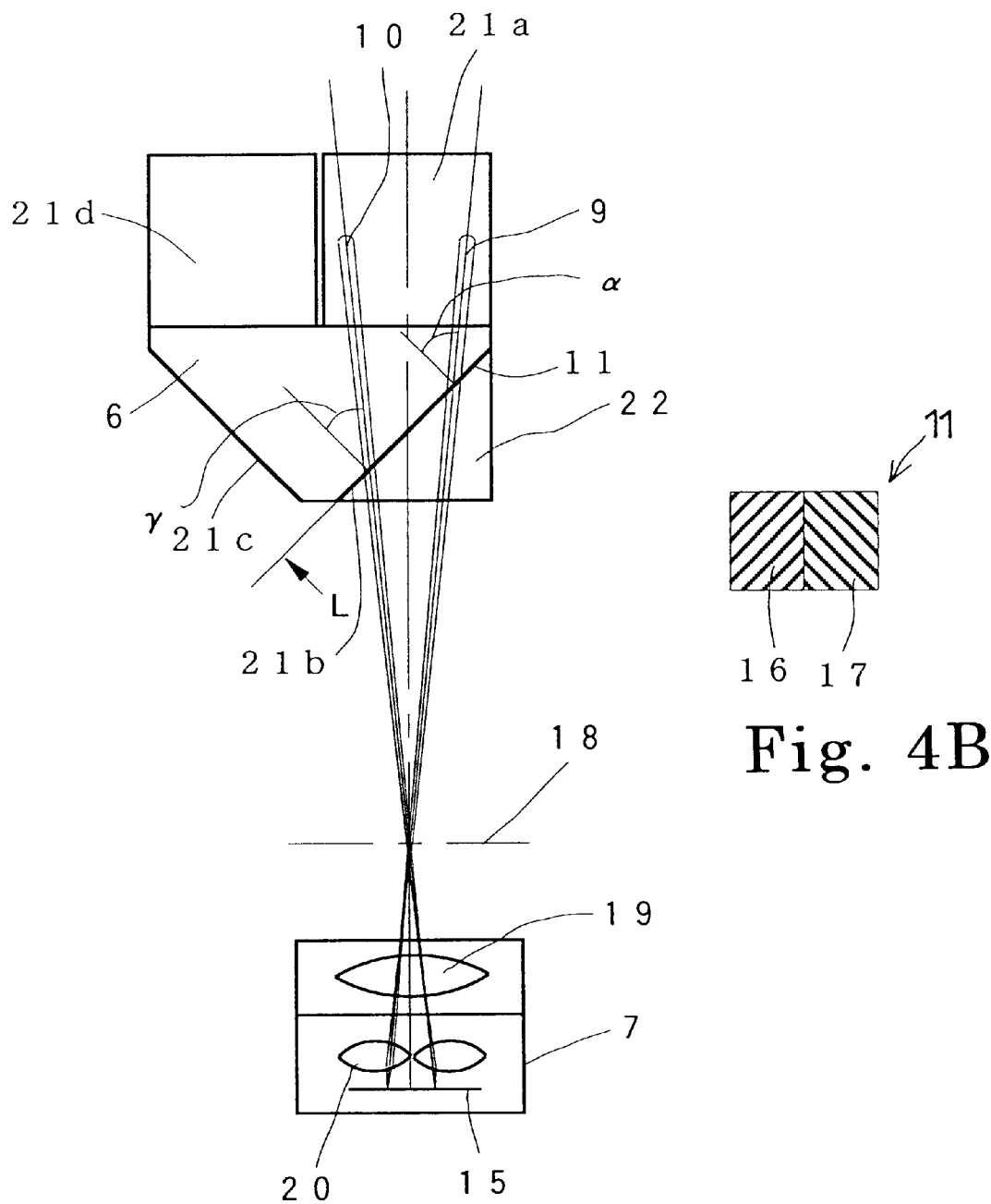
FIG. 4A is an enlarged front view of a main portion of a total station according to a first embodiment of the present invention.
FIG. 4B is an end view of a coated splitter surface, viewed from an arrow L in FIG. 4A.
Figure 5:
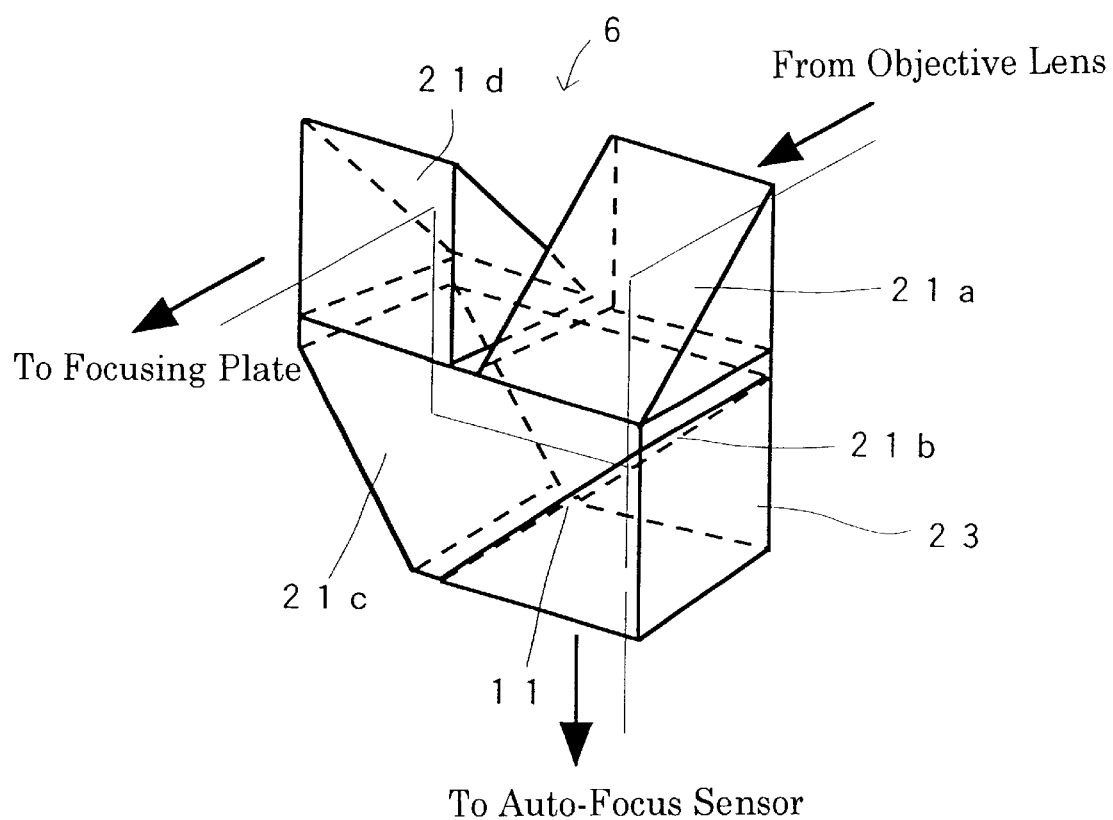
FIG. 5 is a perspective view of a Porro prism shown in FIG. 4A.

In the first embodiment, as shown in FIG. 4A which is an enlarged front view of the Porro prism 6, the auto-focus sensor module 7 is located below the Porro prism 6, and a prism 22 is attached to a second reflection surface 21b of the Porro prism 6, so that the boundary surface therebetween defines the coated splitter surface 11 of a beam splitter (FIG. 5). Namely, in this embodiment, light incident upon the Porro prism 6 is split by the splitter surface 11 into reflected light and transmitted light. Thereafter, the reflected light forms an erect image on the focusing plate 5, and the transmitted light reaches the auto-focus sensor module 7 and forms object images on the pair of CCD sensors 15. The CCD sensors 15 are disposed in a plane normal to the optical axis of the condenser lens 17 connecting the centers of the splitter surface 11 and the auto-focus sensor module 7 and are juxtaposed in the lateral direction in FIG. 4, i.e., in the lateral direction in the collimation field. This arrangement is particularly advantageous when an object, for which the surveying instrument is to be collimated, is a vertically elongated member such as a pole. The CCD sensors 15 receive the beams 9 and transmitted through the splitter surface 11. As shown in FIG. 4A, the beams of light 9 and are incident upon the splitter surface 11 at different incident angles $\alpha$ and $\gamma$.

In general, the coated splitter surface 11 is defined by a multi-layered dielectric film coated thereon and having less absorption of light, the transmittance and reflectance thereof being determined based on the incident angle (45°) of light incident upon the center portion thereof. The transmittance of the dielectric film varies depending on the incident angle. Therefore, there is no difference in the quantity of light between the beams 9 and 10 before the splitter surface 11, but there is a difference in the quantity of light between the beams 9 and 10 that are transmitted through the splitter surface 11. To prevent this problem, in this embodiment, the splitter surface 11 coated with the multi-layered dielectric film is divided into two halves, i.e., right and left coated areas 16 and 17 with respect to the center line thereof. The optical properties of the coated areas 16 and 17 are designed in accordance with the incident angles α and γ of the right and left beams of light 9 and 10.

Figure 8:
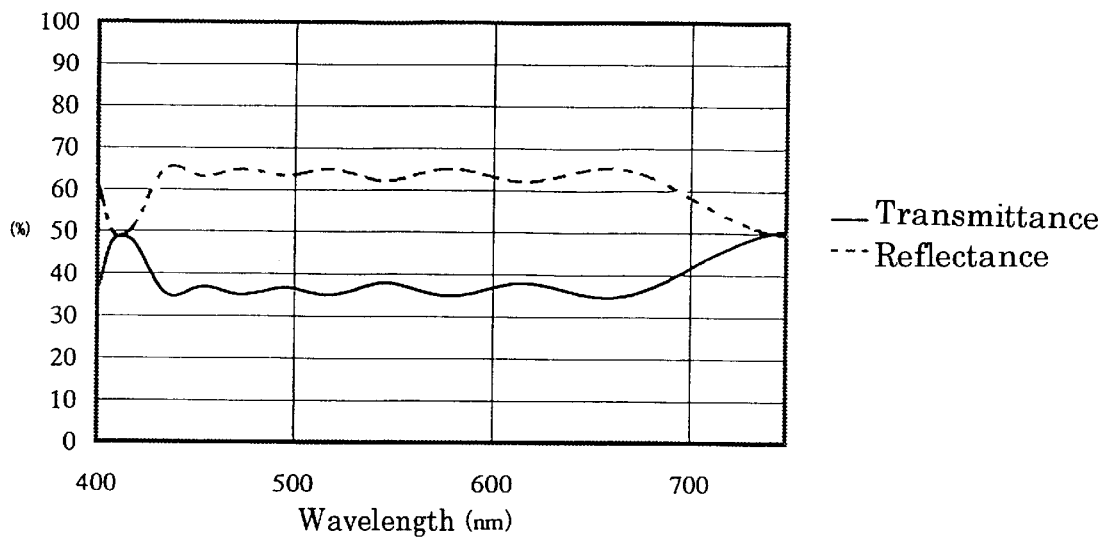
FIG. 8 is a graph showing transmittance and reflectance for right-side light incident at an incident angle of $\alpha$.
Figure 9:
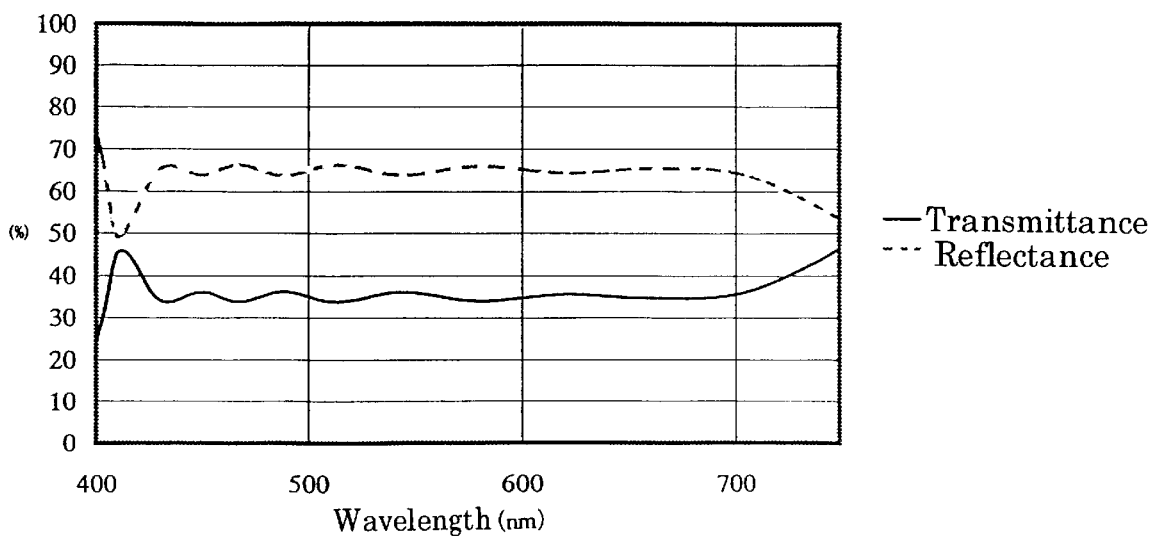
FIG. 9 is a graph showing transmittance and reflectance for left-side light incident at an incident angle of $\gamma$.

Numerical data of the multi-layered dielectric film used in the first embodiment is shown in Tables 1 and 2 below. Tables 1 and 2 show the structure of the dielectric film which meets the incident angles α (47.5°) and γ (42.5°) of the right-side light and left-side light. In Tables 1 and 2, the materials A, B, C have different refractive indexes and form layers having thicknesses as indicated in the Tables between the BK7 (optical glass), i.e., the prism 22 and an adhesive layer. The change in the transmittance and reflectance depending on the wavelength of the incident light at the incident angles α and γ is shown in FIGS. 8 and 9, respectively. The film structure is an example, and the invention is not limited thereto.

TABLE 1

| Material BK7 (Optical Glass) | | Refractive Index 1.5181 | Optical thickness (μm) |
|---|---|---|---|
| 1 | A | 2.3470 | 231.256 |
| 2 | B | 1.4693 | 261.927 |
| 3 | A | 2.3470 | 175.5971 |
| 4 | B | 1.4693 | 281.899 |
| 5 | A | 2.3470 | 176.4881 |
| 6 | B | 1.4693 | 228.8399 |
| 7 | A | 2.3470 | 177.634 |
| 8 | B | 1.4693 | 285.815 |
| 9 | A | 2.3470 | 151.225 |
| 10 | B | 1.4693 | 200.995 |
| 11 | A | 2.3470 | 124.105 |
| 12 | B | 1.4693 | 186.2864 |
| 13 | A | 2.3470 | 125.8359 |
| 14 | B | 1.4693 | 197.7924 |
| 15 | A | 2.3470 | 134.431 |
| 16 | C | 1.6400 | 325.351 |
| Adhesive Layer | | 1.4900 | |

TABLE 2

| Material BK7 (Optical Glass) | | Refractive Index 1.5181 | Optical thickness (μm) |
|---|---|---|---|
| 1 | A | 2.3470 | 253.369 |
| 2 | B | 1.4693 | 191.139 |
| 3 | A | 2.3470 | 249.773 |
| 4 | B | 1.4693 | 167.027 |
| 5 | A | 2.3470 | 171.428 |
| 6 | B | 1.4693 | 304.890 |
| 7 | A | 2.3470 | 136.285 |
| 8 | B | 1.4693 | 157.466 |
| 9 | A | 2.3470 | 183.828 |
| 10 | B | 1.4693 | 76.190 |
| 11 | A | 2.3470 | 192.053 |
| 12 | B | 1.4693 | 124.447 |
| 13 | A | 2.3470 | 121.583 |
| 14 | C | 1.6400 | 643.913 |
| Adhesive Layer | | 1.4900 | |

With the divided areas of the coated splitter surface, the difference in the quantity of light between the beams 9 and 10 received by the CCD sensors 15 is reduced, so that the output difference of the auto-focus sensor module 7 can be reduced.

Namely, in the first embodiment, the difference in the quantity of light between the beams 9 and 10 is minimized when the beams pass through the corresponding divided areas of the splitter surface coated with the multi-layered dielectric film and thereafter, the beams reach the auto-focus sensor module 7. Thus, a precise focusing operation can be achieved.

The present invention can be equally applied to an alternative arrangement in which the splitter surface 11 is defined by the first reflection surface 21a, the third reflection surface 21c, or the fourth reflection surface 21d of the Porro prism 6.

Figure 7:
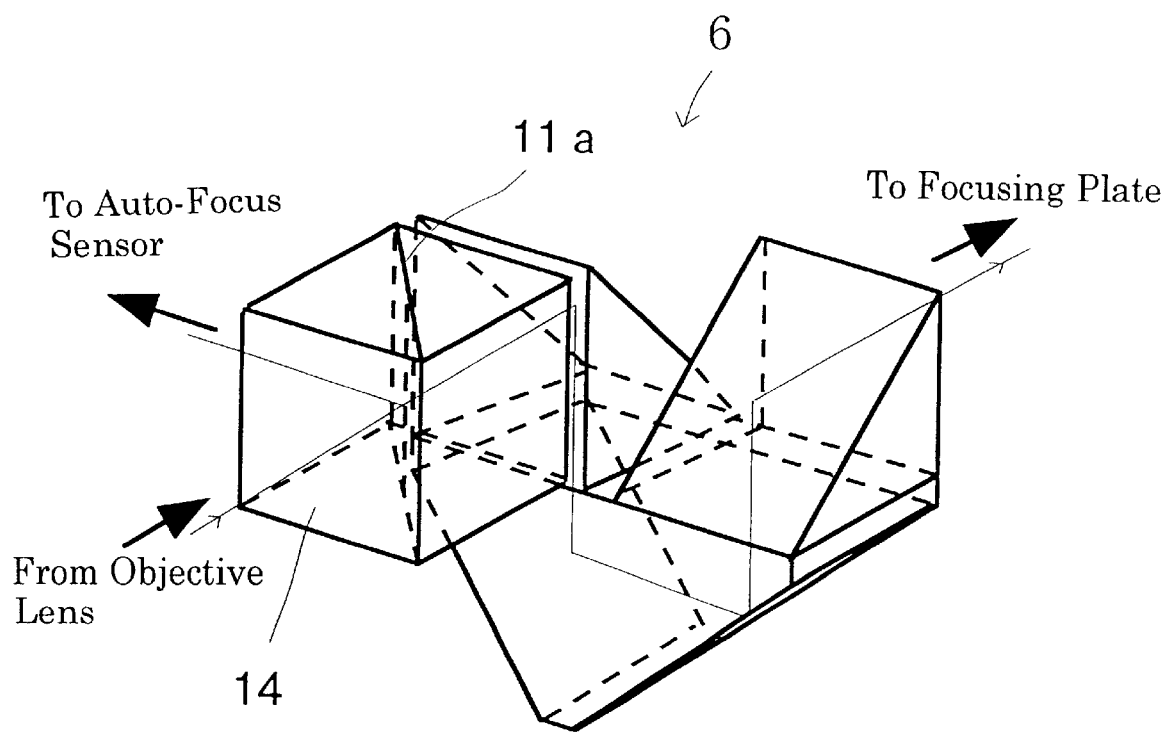
FIG. 7 is a perspective view of a Porro prism shown in FIG. 6A.

In the second embodiment, the beam splitter 14 is provided on the front side of the Porro prism 6, i.e., on the objective lens side (see FIG. 7), as can be seen in FIG. 6 which shows a top view of the Porro prism 6 and its surroundings. A pair of CCD sensors 15 are disposed in a plane normal to the optical axis of the condenser lens 19 connecting the centers of the splitter surface 11a and the auto-focus sensor module 7 and are juxtaposed in the lateral direction; i.e., in the lateral direction with respect to the field of view. In this embodiment, the beams 12 and 13 are incident upon the coated splitter surface 11a at different incident angles α and γ, so that the reflectances of the splitter surface 11a at the different incident points are different, due to the design, or the angle-dependency of, the multi-layered dielectric film. Consequently, there is a difference in the quantity of light between the beams 12 and 13 received by the CCD sensors 15.

To prevent this problem, the splitter surface 11 coated with the multi-layered dielectric film is divided into two halves, i.e., right and left areas 16a and 17a separated from one another with respect to the center line thereof. The optical properties of the coated areas 16a and 17a are designed in accordance with the incident angles α and γ of the right and left beams 9 and 10. The structure of the dielectric film in the second embodiment is the same as that in the first embodiment mentioned above, but is not limited thereto. Consequently, the difference in the quantity of light received by the CCD sensors 15 within the auto-focus sensor module 7 is minimized.

Namely, in the second embodiment, the light entering the optical system through the objective lens 8 is transmitted through the focusing lens 4 and is split by the beam splitter 14 located in front of the Porro prism 6 into transmitted light and reflected light. The transmitted light is incident upon the Porro prism to form an erect image on the focusing plate 5. The beams of the reflected light are reflected by the corresponding right and left areas 16a and 17a of the splitter surface. Consequently, the difference in the quantity of light between the beams 12 and 13 is reduced and thereafter, the beams reach the auto-focus sensor module 7 to carry out a precise focusing operation.

The invention can be generally applied to an arrangement in which the beam splitter 14 and the auto-focus sensor module 7 are arranged so that the beams of light 12 and 13 to be received by a pair of CCD sensors 15 are incident upon the splitter surface 11a at different incident angles.

As can be understood from the above discussion, since the divided areas of the splitter surface is coated with a multi-layered dielectric film corresponding to the incident angle of each incident beam to be received by a pair of light receiving elements within the focus detection optical system. Therefore, there is little or no difference in the quantity of light to be received by the light receiving elements even in a conventional layout of the optical components in which the difference in the quantity of light could be otherwise produced. Consequently, the freedom of layout of the components can be enhanced, thus resulting in miniaturization, reduction of weight, and improvement of operability.

Moreover, in comparison with the correction of the difference in the quantity of light, using the correction coefficient, the optical system is less influenced by electrical noise. Thus, a precise automatic focusing operation can be achieved.

What is claimed is:

1. A beam splitting optical system for an automatic focusing apparatus comprising:

an optical system having an objective optical system and a viewing optical system;

a beam splitter provided between the objective optical system and the viewing optical system, said beam splitter being provided with a splitter surface to split object-carrying light transmitted through the objective optical system, said splitter surface being divided into at least two areas, said at least two areas comprising multi-layered dielectric films that have different film structures depending upon the transmittance and reflectance thereof; and a focus detection optical system having a pair of light receiving elements which respectively receive an object-carrying light beam split by and transmitted through the splitter surface of the beam splitter, said focus detection optical system being arranged so that said object-carrying light beam received by the respective light receiving elements is incident upon the splitter surface at different incident angles;

wherein the transmittance and reflectance of the splitter surface of the beam splitter is set so that the transmittance and reflectance changes depending on the incident angle of the object-carrying light incident thereupon to compensate for the difference in distribution quantity of the object-carrying light beam that passes through the splitter surface, said difference being caused due to the difference of the incident angle of the object-carrying light beam incident upon the splitter surface.

2. A beam splitting optical system for an automatic focusing apparatus according to claim 1, wherein the transmittance and reflectance of the splitter surface is determined so that the quantities of the object-carrying light beams transmitted therethrough or reflected thereby are substantially identical.

3. A beam splitting optical system for an automatic focusing apparatus according to claim 1, wherein the splitter surface comprises a reflection surface of an optical element which constitutes an image erecting optical system provided in the optical system.

4. A beam splitting optical system for an automatic focusing apparatus according to claim 3, wherein said optical element is a Porro prism.

5. A beam splitting optical system for an automatic focusing apparatus comprising:

an optical system having an objective optical system and a viewing optical system through which an object image formed on a predetermined focusing surface by the objective optical system can be viewed;

a beam splitter provided between the objective optical system and the viewing optical system, said beam splitter being provided with a splitter surface to split object-carrying light transmitted through the objective optical system, said splitter surface being divided into at least two areas, said at least two areas comprising multi-layered dielectric films that have different film structures depending on the transmittance and reflectance thereof; and an auto-focus sensor module which detects a focus state on a reference focusing surface which is optically equivalent to the predetermined focusing surface, said auto-focus sensor module positioned along the light path of the object-carrying light split by the beam splitter, said auto-focus sensor module being provided with a pair of optical sensors, said auto-focus sensor module and said beam splitter being arranged so that an object-carrying light beam received by the pair of optical sensors is incident upon the splitter surface of the beam splitter at different incident angles;

wherein the transmittance and reflectance of the splitter surface of the beam splitter is set so that the transmittance and reflectance changes depending on the incident angle of the object-carrying light incident thereupon to compensate for the difference in distribution quantity of the object-carrying light beam that passes through the splitter surface, said difference being caused due to the difference of the incident angle of the object-carrying light beam incident upon the splitter surface.

6. A beam splitting optical system for an automatic focusing apparatus according to claim 5, wherein the transmittance and reflectance of the splitter surface is determined so that the quantities of the object-carrying light beams transmitted therethrough or reflected thereby are substantially identical.

7. A beam splitting optical system for an automatic focusing apparatus according to claim 5, wherein the splitter surface comprises a reflection surface of an optical element which constitutes an image erecting optical system provided in the optical system.

8. A beam splitting optical system for an automatic focusing apparatus according to claim 7, wherein said optical element is a Porro prism.

* * * * *